United States Patent [19]

Ito

[11] Patent Number: 5,294,420
[45] Date of Patent: Mar. 15, 1994

[54] PROCESS FOR THE DESULFURIZATION AND DENITRIFICATION OF A WASTE GAS CONTAINING HALOGEN-CONTAINING MATERIALS

[75] Inventor: Yoshiro Ito, Tokyo, Japan

[73] Assignee: Mitsui Mining Company, Limited, Tokyo, Japan

[21] Appl. No.: 942,829

[22] Filed: Sep. 10, 1992

[30] Foreign Application Priority Data

Sep. 18, 1991 [JP] Japan .................................. 3-265371
Apr. 3, 1992 [JP] Japan .................................. 4-109038

[51] Int. Cl.$^5$ ........................ C01B 21/00; C01B 7/00; C01B 17/00; B01J 8/00
[52] U.S. Cl. .............................. 423/239.1; 423/240 S; 423/244.01; 423/244.03
[58] Field of Search .................... 423/235, 235 D, 239, 423/239 A, 239.4, 244.01, 244.03, 240 S

[56] References Cited

U.S. PATENT DOCUMENTS

| | | | |
|---|---|---|---|
| 2,992,895 | 7/1961 | Feustel et al. | 423/239 |
| 4,272,497 | 6/1981 | Takahashi et al. | 423/239 |
| 4,500,501 | 2/1985 | Hamada et al. | 423/239 |
| 4,741,884 | 5/1988 | Ritter et al. | 423/239 |
| 4,789,531 | 12/1988 | Eichholtz et al. | 423/239 |
| 5,053,210 | 10/1991 | Buxel et al. | 423/239 |

Primary Examiner—Gregory A. Heller
Attorney, Agent, or Firm—Wenderoth, Lind & Ponack

[57] ABSTRACT

A stable processing of a waste gas containing halogen-containing materials is rendered possible without fear of increase of the pressure loss or clogging of a louver unit near the waste gas inlet in a second moving bed due to accumulation of the halogen components. This can be accomplished by a process for the desulfurization and denitrification of a waste gas containing halogen-containing materials in addition to $SO_x$ and $NO_x$ comprising using a gas-processing apparatus consisting of a first moving bed and a second moving bed in which a carbonaceous adsorbent is moved from the upper part to the lower part, firstly feeding the waste gas to the first moving bed and passing it transversely through a carbonaceous adsorbent where desulfurization is mainly carried out, then adding ammonia to the waste gas having passed through the first moving bed, feeding it to the second moving bed and passing it transversely through the carbonaceous adsorbent where denitrification is mainly carried out, while feeding the carbonaceous adsorbent firstly to the second moving bed where the carbonaceous adsorbent is subjected to denitrification, then feeding the carbonaceous adsorbent to the first moving bed where the carbonaceous adsorbent is subjected to adsorption of sulfur oxides and then subjecting to regeneration, characterized in that a gas permeable partition plate is provided in parallel with the flow of the carbonaceous adsorbent in the second moving bed to divide the bed of the adsorbent into a bed at the inlet side of the waste gas and another bed at the outlet side, the carbonaceous adsorbent having moved downward in the bed at the outlet side of the waste gas is fed to the first moving bed as it is, and the carbonaceous adsorbent having moved downward in the bed at the inlet side of the waste gas, and adsorbed ammonium halides, is taken out of the system and subjected to regeneration.

4 Claims, 2 Drawing Sheets

PROCESS FOR THE DESULFURIZATION AND DENITRIFICATION OF A WASTE GAS CONTAINING HALOGEN-CONTAINING MATERIALS

BACKGROUND OF THE INVENTION

1. Field of the Invention

This invention relates to an improved process for desulfurization and denitrification of a waste gas containing sulfur oxides, nitrogen oxides and halogen-containing materials such as hydrogen chloride, hydrogen fluoride, etc., more specifically a waste gas from combustion of coal, containing relatively large amounts of halogens, for example, about several ppm to 200 ppm of halogen components.

2. Description of the Prior Art

Various methods have been developed and examined as to the desulfurization and denitrification technique of various combustion waste gas. Above all, it is expected that the desulfurization and denitrification method by dry process using a carbonaceous adsorbent will be increasingly used because of many advantages in that there is no problem of disposal of waste water and the process can be carried out with a reduced installation area.

The desulfurization and denitrification technique using a carbonaceous adsorbent consists of a method comprising passing a waste gas transversely through a reactor of a moving bed type wherein a carbonaceous adsorbent is vertically moved from the upper part to the lower part, whereby sulfur oxides are adsorbed and removed and nitrogen oxides are decomposed and removed by the aid of ammonia. In this method, when the concentration of sulfur oxides in a waste gas to be processed is low, the desulfurization and denitrification can simultaneously be accomplished in one reactor, but when the concentration of sulfur oxides is high, it is required to use a gas processing apparatus comprising a reactor consisting of a first moving bed and second moving bed, connected in series, in which a carbonaceous adsorbent is moved from the upper part to the lower part, and to effect mainly desulfurization by firstly feeding a waste gas to the first moving bed and passing the waste gas transversely through the carbonaceous adsorbent layer, and then mainly denitrification by adding ammonia to the waste gas passed through the first moving bed, feeding to the second moving bed and passing the waste gas transversely through the carbonaceous adsorbent layer. In this case, the carbonaceous adsorbent is firstly fed to the second moving bed, subjected to denitrification reaction, then fed to the first moving bed to adsorb sulfur oxides and the carbonaceous adsorbent whose activity is lowered by the adsorption of sulfur oxides in the form of sulfuric acid or ammonium salt is discharged from the reactor, followed by subjecting to regeneration and reusing.

In such a desulfurization and denitrification method by dry process, even if halogen-containing materials such as hydrogen chloride are contained in a waste gas to be processed, these materials can be adsorbed and removed together with sulfur oxides when the adsorption capacity of the carbonaceous adsorbent is sufficient. However, these halogen-containing materials are more difficult to be adsorbed on a carbonaceous adsorbent as compared with sulfur oxides and accordingly, when the concentration of sulfur oxides is high and the adsorption capacity of the carbonaceous adsorbent is not sufficient, or when a processing operation is carried out under such a condition that movement of the carbonaceous adsorbent is controlled to adsorb sulfur oxides up to near the saturation adsorption quantity, the halogen-containing materials are hardly adsorbed and are passed through the first moving bed, followed by reacting with ammonia gas added between the first moving bed and the second moving bed to form ammonium halides, entering the second moving bed with the waste gas and adsorbing on the carbonaceous adsorbent in the second moving bed. The carbonaceous adsorbent, on which ammonium halides have been adsorbed, is moved downward in the moving bed and fed to the first moving bed. When the ammonium halide-adsorbing carbonaceous adsorbent is contacted with a waste gas containing a large amount of sulfur oxides in the first moving bed, the sulfur oxides and ammonium halides are reacted to form ammonium sulfate and ammonium sulfite and to again generate hydrogen halide gases. That is, the halogen-containing materials contained in the waste gas are cycled and gradually accumulated between the first moving bed and the second moving bed. When the concentration of halogens is increased in the gas fed from the first moving bed to the second moving bed, the amount of ammonium halides formed by addition of ammonia gas is increased and the ammonium halides are adsorbed in large amounts on the carbonaceous adsorbent in the second moving bed, in particular, on the carbonaceous adsorbent at the gas inlet side, causing problems of increase of the pressure loss and clogging of an inlet louver.

SUMMARY OF THE INVENTION

It is an object of the present invention to provide a process for the removal of $SO_x$ and $NO_x$ from a waste gas containing halogen-containing materials in addition to $SO_x$ and $NO_x$, whereby the above described problems of the prior art can be solved.

It is another object of the present invention to provide a process for the desulfurization and denitrification of a waste gas containing halogen-containing materials, whereby the problem of increase of a pressure loss and clogging of a louver unit at a waste gas inlet side due to accumulation of halogen components can effectively be solved.

It is a further object of the present invention to provide a moving bed reactor for the desulfurization and denitrification of a waste gas containing halogen-containing materials, whereby the problem of increase of a pressure loss and clogging of a louver unit at a waste gas inlet side due to accumulation of halogen componets can be solved.

These objects can be attained by a process for the desulfurization and denitrification of a waste gas containing halogen-containing materials in addition to SOx and NOx comprising using a gas-processing apparatus consisting of a first moving bed and a second moving bed in which a carbonaceous adsorbent is moved from the upper part to the lower part, firstly feeding the waste gas to the first moving bed and passing it transversely through the carbonaceous adsorbent where desulfurization is mainly carried out, then adding ammonia to the waste gas having passed through the first moving bed, feeding it to the second moving bed and passing it transversely through the carbonaceous adsorbent where denitrification is mainly carried out, while feeding the carbonaceous adsorbent firstly to the second moving bed where the carbonaceous adsorbent is subjected to denitrification, then feeding the carbonaceous adsorbent to the first moving bed where the carbonaceous adsorbent is subjected to adsorption of sulfur oxides and then subjecting it to regeneration, characterized in that a gas permeable partition wall is provided in parallel with the flow of the carbonaceous adsorbent in the second moving bed to divide the bed of the adsorbent into a bed (Bed A) at the inlet side of the waste gas and another bed (Bed B) at the outlet side, the carbonaceous adsorbent having moved downward in the bed at the outlet side of the waste gas is fed to the first moving bed as it is, and the carbonaceous adsorbent having moved downward in the bed at the inlet side of the waste gas, and adsorbed ammonium halides, is taken out of the system and subjected to regeneration.

BRIEF DESCRIPTION OF THE DRAWINGS

The accompanying drawings illustrate the principle and merits of the present invention in greater detail.

DETAILED DESCRIPTION OF THE INVENTION

The inventor has made various efforts to improve a moving bed reactor for the desulfurization and denitrification of a waste gas and consequently, reached the present invention relating to the moving bed reactor for the desulfurization and denitrification of a waste gas, in particular, containing halogen-containing materials in addition to SOx and NOx.

Figure 1:
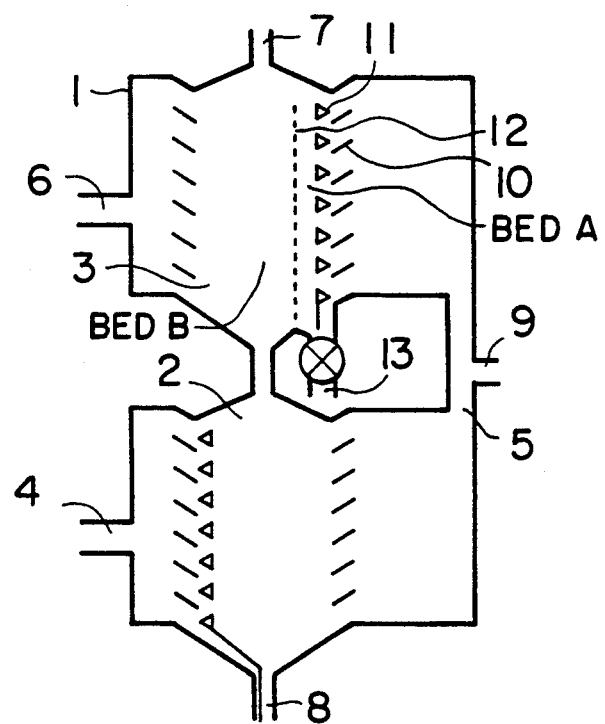
FIG. 1 is a schematic view of one embodiment of an apparatus for the desulfurization and denitrification according to the present invention.
Figure 2:
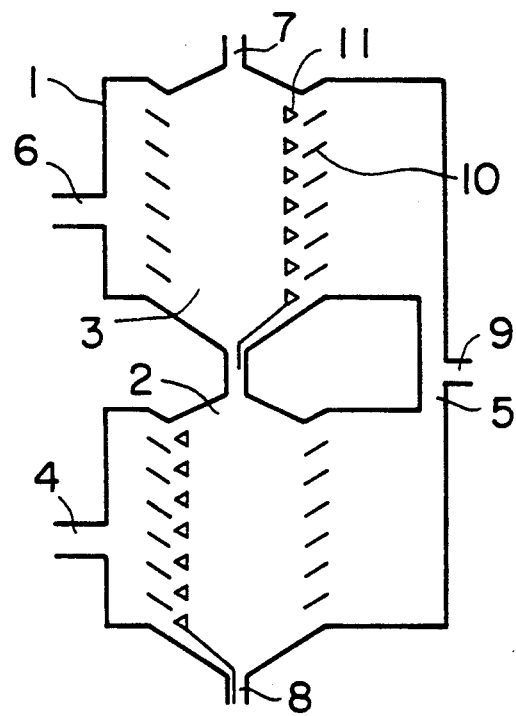
FIG. 2 is a schematic view of an apparatus for the desulfurization and denitrification according to the prior art.

The process of the present invention will now be illustrated in detail referring to the accompanying drawings, in which FIG. 1 is a schematic view of a preferred embodiment of the present invention and FIG. 2 is a schematic view of a desulfurization and denitrification apparatus of the prior art.

In these apparatus, a desulfurization and denitrification apparatus 1 is composed of a first moving bed 2 for mainly effecting desulfurization and a second moving bed 3 for mainly effecting denitrification. A waste gas is first fed to the first moving bed 2 via a waste gas inlet 4, contacted transversely with a carbonaceous adsorbent, introduced into the apparatus 1 through adsorbent feed port 7, moving from the upper part to the lower part in the apparatus to adsorb and remove the most part of sulfur oxides, and then fed to the second moving bed 3 through a gas path 5, during which ammonia is added to the waste gas from an ammonia feed port 9. This ammonia-containing waste gas is transversely contacted with the carbonaceous adsorbent in the second moving bed, where nitrogen oxides are decomposed and removed by the action of the carbonaceous adsorbent and ammonia and the residual sulfur oxides are also adsorbed and removed to render them harmless, and then discharged to outside the system from a waste gas outlet 6.

For carrying out the process for the desulfurization and denitrification of a waste gas containing halogen-containing materials according to the present invention it is suitable to use, for example, an apparatus comprising a first moving bed and a second moving bed in which a carbonaceous adsorbent is moved from the second moving bed to the first moving bed, louver units provided at both the sides of the first and second moving beds for holding the carbonaceous adsorbent moving downward, a gas-permeable partition plate provided in parallel with the flow of the carbonaceous adsorbent in the second moving bed to divide the bed of the adsorbent into a bed at the inlet side of the waste gas and another bed at the outlet side, the carbonaceous adsorbent having moved downward in the bed at the outlet side of the waste gas being fed to the first moving bed as it is, and the carbonaceous adsorbent having moved downward in the bed at the inlet side of the waste gas and adsorbed ammonium halides being taken out of the system and subjected to regeneration, sublouvers provided inside the louver units at the gas inlet sides of the first and second moving beds, and an adsorbent discharge port provided at the lower part of the bed at the inlet side of the waste gas in the second moving bed.

In such a desulfurization and denitrification process, the quantity of movement of the carbonaceous adsorbent is so controlled, from the standpoint of effective utilization of the carbonaceous adsorbent, that the quantity of adsorption of sulfur oxides substantially reaches the saturation point. Since the adsorption on a carbonaceous adsorbent is anticipated by sulfur oxides more readily being adsorbable, halogen-containing materials such as hydrogen chloride, hydrogen fluoride, etc., contained in a waste gas, are hardly adsorbed thereby and thus are passed through the first moving bed. When ammonia gas is added in the gas path 5 for guiding the waste gas from the first moving bed 2 to the second moving bed 3, the halogen-containing materials are reacted with ammonia to precipitate ammonium halides. The thus formed ammonium halides are caught by the carbonaceous adsorbent in the second moving bed 3 and moved to the first moving bed 2, where the ammonium halides are contacted and decomposed with sulfur oxides contained in the waste gas to again give hydrogen halides which are mixed in the gas flow. Thus, the halogen components contained in the waste gas are cycled in the course of first moving bed 2→gas path 5→second moving bed 3, gradually accumulated and concentrated. When the concentration of the halogen components is increased in the waste gas, the amount of the ammonium halides formed by the reaction with ammonia gas is also increased and they tend to adhere to a louver 10 at the gas inlet in the second moving bed 3, a sub-louver 11 and the carbonaceous adsorbent flowing at the inlet side, resulting in problems that the pressure loss is increased and clogging takes place.

The process of the present invention aims at preventing the halogen components from accumulation in the above described $SO_x$ and $NO_x$ removal system. As shown in FIG. 1, for example, the feature of the present invention consists in providing a gas-permeable partition plate 12 inside the inlet louver 10 in the second moving bed 3 to divide the bed of the carbonaceous adsorbent in the second moving bed 3 into a bed (Bed A) at the inlet side of the waste gas and another bed (Bed B) at the outlet side thereof, feeding the carbonaceous adsorbent with a small adsorption amount of ammonium halides, flowing downward in Bed B, to the first moving bed 2 as it is, withdrawing the carbonaceous adsorbent carrying a large amount of ammonium halides, flowing downward in Bed A, out of an adsorbent discharge port 13 to outside the system, combining with the adsorbent leaving an adsorbent discharge port 8 in the first moving bed 2 and then subjecting it to regeneration. The structure of the partition plate 12 is not particularly limited, but any gas-permeable structure can be used such as porous or perforated plates having air holes with various shapes, various grating plates, etc. which are capable of dividing the bed of a carbonaceous adsorbent and have sufficient gas-permeability. The size, structure and installation position of the partition plate 12 can suitably be determined depending on the size of the apparatus and operation conditions such as gas flow rate, concentration of harmful components contained in a gas, etc.

In the desulfurization and denitrification apparatus of this type, accumulation of dust, adsorption of sulfur oxides and reaction with ammonia rapidly take place near the gas inlet of each of the adsorbent beds and accordingly, residence of the adsorbent or accumulation of dust or reaction products results in increase of the pressure loss, in an extreme case, clogging of the louver. Therefore, a sub-louver is ordinarily provided inside a main louver so as to prevent the louver at the gas inlet from accumulation of the carbonaceous adsorbent thereon. When such a sub-louver is provided, the function of the partition plate according to the present invention can be given to the sub-louver by controlling the position and shape of the sub-louver in such a manner that the carbonaceous adsorbent flowing downward between the main louver and sub-louver can be withdrawn out of the system.

At the lower part of Bed A formed between the louver 10 at the gas inlet and partition plate 12, there is provided the adsorbent discharge port 13, from which the adsorbent carrying a large amount of ammonium halides is withdrawn out of this system without entering the first moving bed 2. The thus withdrawn adsorbent is fed to a regeneration process and regenerated with the adsorbent discharged from the adsorbent dicharge port 8 of the first moving bed 2. In this way, the accumulation of halogen components in the desulfurization and denitrification apparatus can be prevented, thereby solving the problems of increase of the pressure loss and clogging of the louver at the gas inlet, caused by the accumulation.

The ratio of the carbonaceous adsorbents moving in Beds A and B can suitably be determined by the operation conditions, etc., as described above, but specifically, it can be controlled by the position of the partition plate determined at the time of designing the apparatus, the quantity of an adsorbent supplied, the quanity thereof withdrawn, controlled by a rotary valve connected to the adsorbent discharge port at the lower part of Bed A. Generally, the ratio of Bed A and Bed B is in the range of 4:96 to 35:65 by volume.

The flow rates of the carbonaceous adsorbent in Bed A and Bed B largely depend upon the operation conditions of the apparatus, e.g. the amount of the carbonaceous adsorbent for the SOx concentration, the amount of halogens and in practice, the flow rate of Bed A is controlled in a suitable range depending on these conditions. Generally, the flow rate of Bed A is in the range of about 0.1 to 5 times as fast as that of Bed B.

According to the present invention, in a process for the desulfurization and denitrification of a waste gas containing halogen-containing materials in addition to $SO_x$ and $NO_x$ comprising using a gas-processing apparatus consisting of a first moving bed and a second moving bed in which a carbonaceous adsorbent is moved from the upper part to the lower part, firstly feeding the waste gas to the first moving bed and passing it transversely through the carbonaceous adsorbent where desulfurization is mainly carried out, then adding ammonia to the waste gas passing through the first moving bed, feeding it to the second moving bed and passing it transversely through the carbonaceous adsorbent where denitrification is mainly carried out, while feeding the carbonaceous adsorbent firstly to the second moving bed where the carbonaceous adsorbent is subjected to denitrification, then feeding the carbonaceous adsorbent to the first moving bed where the carbonaceous adsorbent is subjected to adsorption of sulfur oxides and then subjecting it to regeneration, the moving bed of the carbonaceous adsorbent in the second moving bed is divided by a partition plate and the carbonaceous adsorbent adsorbing a large amount of ammonium halides, flowing downward at the inlet side of the waste gas, is withdrawn outside the system without feeding to the first moving bed, thereby preventing halogen components in the waste gas from recycling and accumulating in the desulfurization and denitrification apparatus. Thus, a stable processing of a waste gas is rendered possible without fear of increase of the pressure loss or clogging of a louver near the waste gas inlet in the second moving bed due to accumulation of the halogen components, which is a problem arising when a waste gas containing a large amount of halogen-containing materials is processed by an apparatus of the prior art.

The following examples are given in order to illustrate the present invention in detail without limiting the same.

EXAMPLES

Using test apparatus each comprising a carbonaceous adsorbent and a gas flow path structure, in which two moving beds of the carbonaceous adsorbent were connected in series, as shown in FIGS. 1 and 2, a waste gas from combustion of coal, comprising 875 ppm of $SO_2$, 440 ppm of $NO_x$, 30 ppm of HCl and balance of $N_2$ was subjected to a test to examine the accumulation state of HCl in the gas path 5 and the progress of the pressure loss. The second moving bed of the carbonaceous adsorbent was composed of 10% of Bed A and 90% of Bed B. In a comparative example, the partition plate 12 was not provided as in the prior art.

The thus obtained test results are shown in Table 1.

TABLE 1

| | Comparative Example | | | | Example | | | |
|---|---|---|---|---|---|---|---|---|
| Passage of Time after Start of Feeding of Gas (hr) | 1 | 5 | 10 | 30 | 1 | 5 | 10 | 30 |
| HCl Concentration in Gas Path 5 (ppm) From Waste Gas Inlet 4 to Outlet 6: | 20 | 25 | 28 | 62 | 20 | 20 | 20 | 20 |
| Pressure Loss (mmAq) | 40 | 44 | 47 | 70 | 40 | 40 | 41 | 40 |
| SOx Removal Efficiency (%) | 100 | 100 | 100 | 100 | 100 | 100 | 100 | 100 |
| NUx Removal Efficiency (%) | 83 | 82 | 81 | 82 | 83 | 83 | 83 | 83 |

What is claimed is:

1. A process for the desulfurization and denitrification of a waste gas containing halogen-containing materials in addition to $SO_x$ and $NO_x$, using a gas-processing apparatus having a first moving bed and a second moving bed in which a carbonaceous adsorbent is moved from an upper part to a lower part of the apparatus, and a gas permeable partition plate provided in parallel with the flow of the carbonaceous adsorbent in the second moving bed to divide the second moving bed of the adsorbent into an inlet side bed and an outlet side bed, which process comprises:

feeding the waste gas to the first moving bed, passing the waste gas transversely through the carbonaceous adsorbent in the first moving bed where desulfurization is mainly carried out, adding ammonia to the waste gas having passed through the first moving bed, feeding the resultant gas to the inlet side bed, passing the waste gas transversely through the carbonaceous adsorbent and gas permeable partition plate in the second moving bed where denitrification is mainly carried out, whereby the carbonaceous adsorbent is firstly fed to the second moving bed where the carbonaceous adsorbent is subjected to catalytic reduction of nitrogen oxides, then the carbonaceous adsorbent is fed to the first moving bed where the carbonaceous adsorbent is subjected to adsorption of sulfur oxides, and then the carbonaceous adsorbent is subjected to regeneration, the carbonaceous adsorbent having moved downward in the outlet side bed in the second moving bed to the first moving bed as it is, and the carbonaceous adsorbent having moved downward in the inlet side bed in the second moving bed to adsorb ammonium halides being taken out of the system and subjected to regeneration.

2. The process for the desulfurization and denitrification of a waste gas containing halogen-containing materials in addition to $SO_x$ and $NO_x$ as claimed in claim 1, wherein the gas-processing apparatus is composed of two moving beds vertically arranged in series, the lower bed being the first moving bed for carrying out mainly the desulfurization, and the upper bed being the second moving bed for carrying out mainly the denitrification.

3. The process for the desulfurization and denitrification of a waste gas containing halogen-containing materials in addition to SO, and NO, as claimed in claim 1, wherein the inlet side bed is formed between a louver 10 at a gas inlet side and a partition plate 12 and is provided, at the lower part, with an adsorbent discharge port 13, and the carbonaceous adsorbent, having flowed in the inlet side bed and adsorbed a large amount of ammonium halides, is withdrawn from an adsorbent discharge port 13 and subjected to regeneration.

4. The process for the desulfurization and denitrification of a waste gas containing halogen-containing materials in addition to $SO_x$ and $NO_x$ as claimed in claim 3, wherein a sub-louver 11 is further provided between the louver 10 and partition plate 12.

* * * * *